Figure 8:
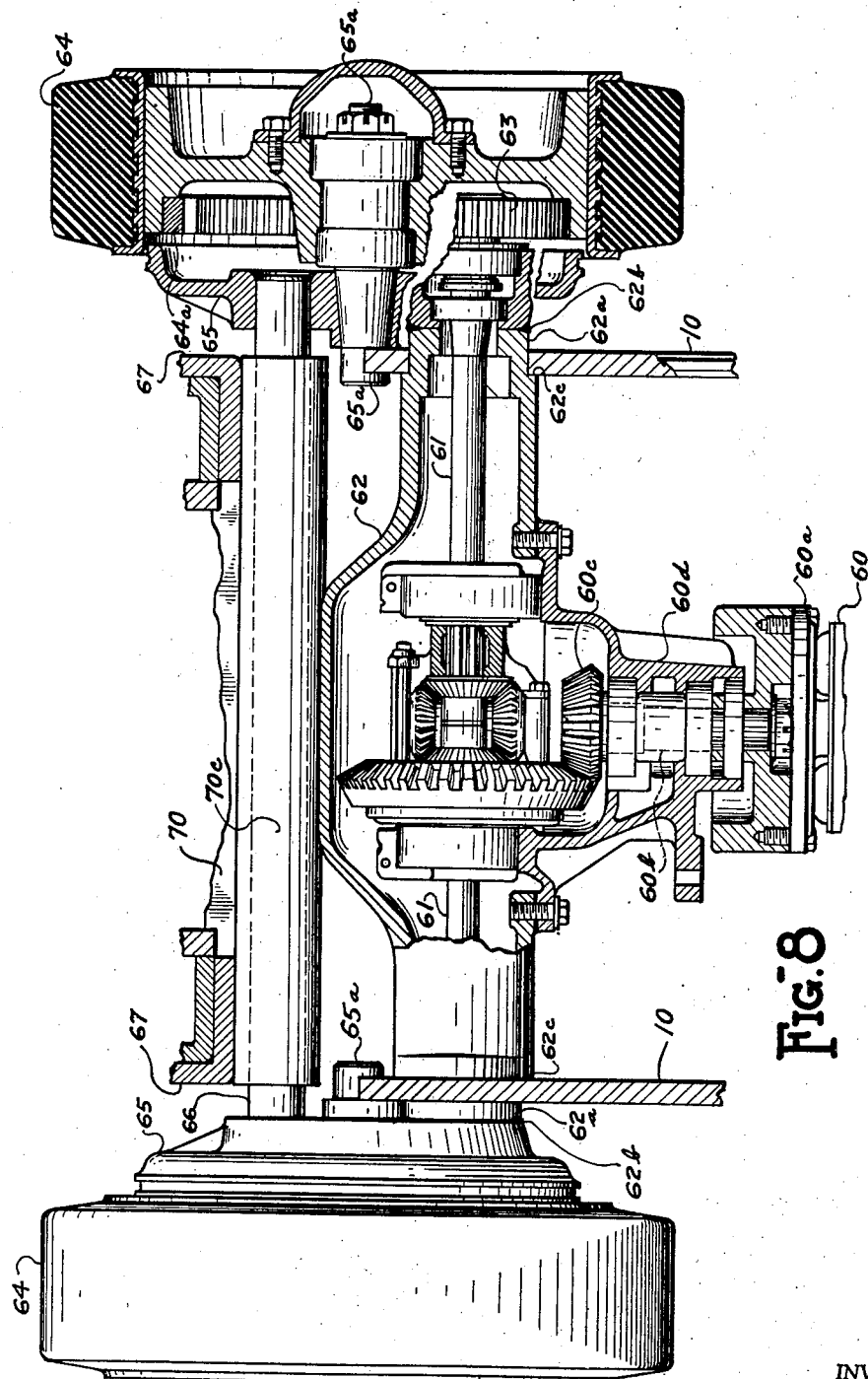

Oct. 20, 1942.  E. W. WEAVER  2,299,445
INDUSTRIAL TRUCK
Filed Aug. 13, 1941  3 Sheets-Sheet 1
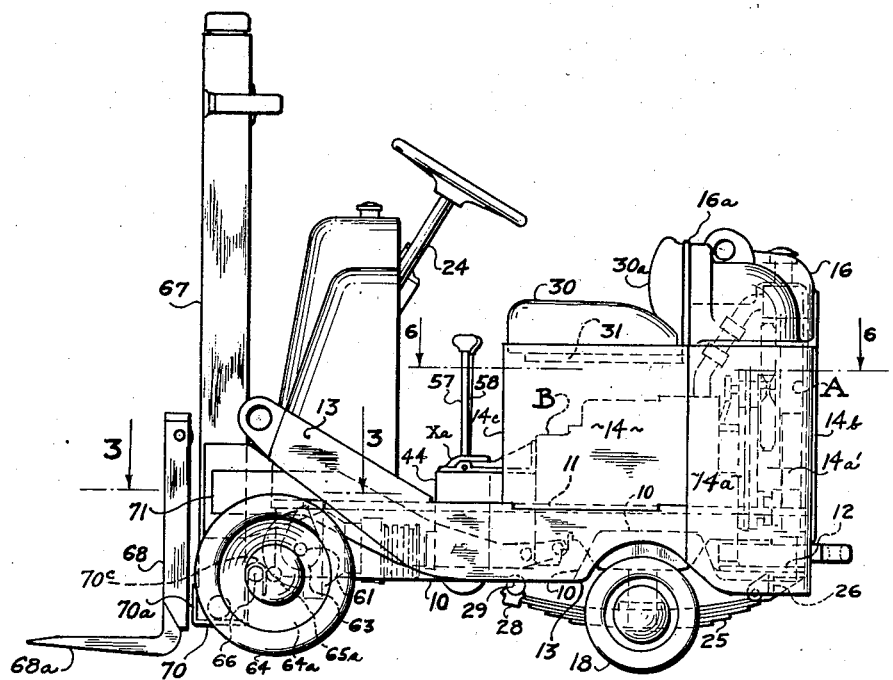
Fig.-1
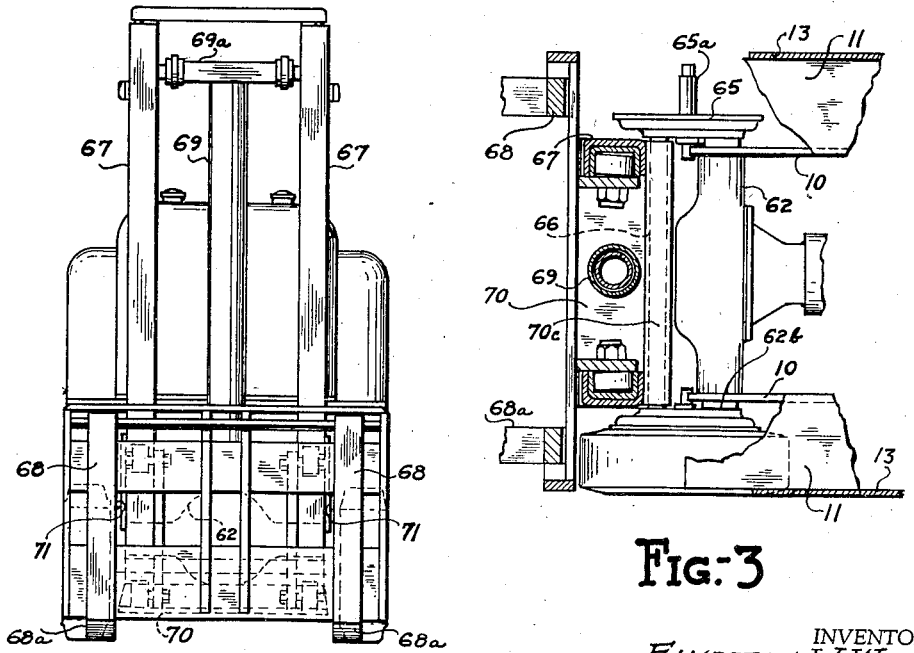
Fig.-2
Fig.-3
INVENTOR.
ELVERTON W. WEAVER
BY
ATTORNEYS.

Oct. 20, 1942.  E. W. WEAVER  2,299,445
INDUSTRIAL TRUCK
Filed Aug. 13, 1941  3 Sheets-Sheet 2
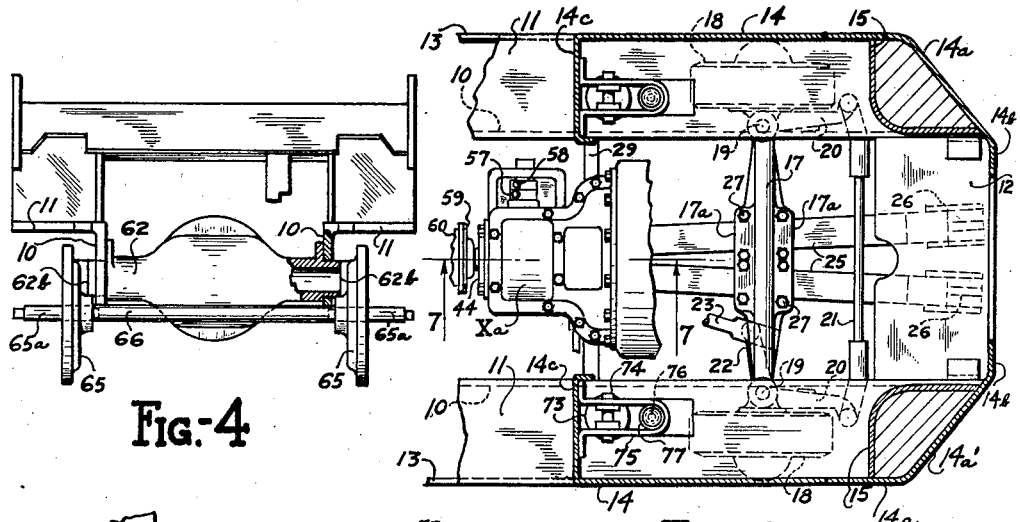
Fig. 4
Fig. 6
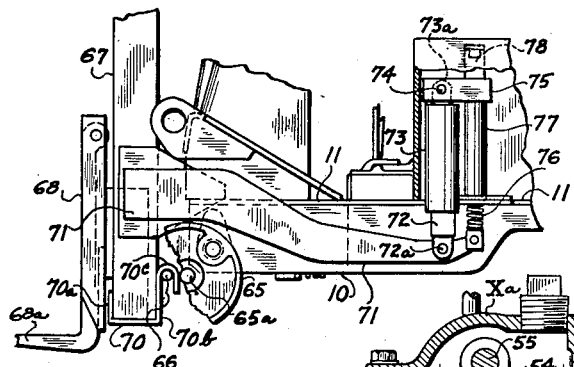
Fig. 5
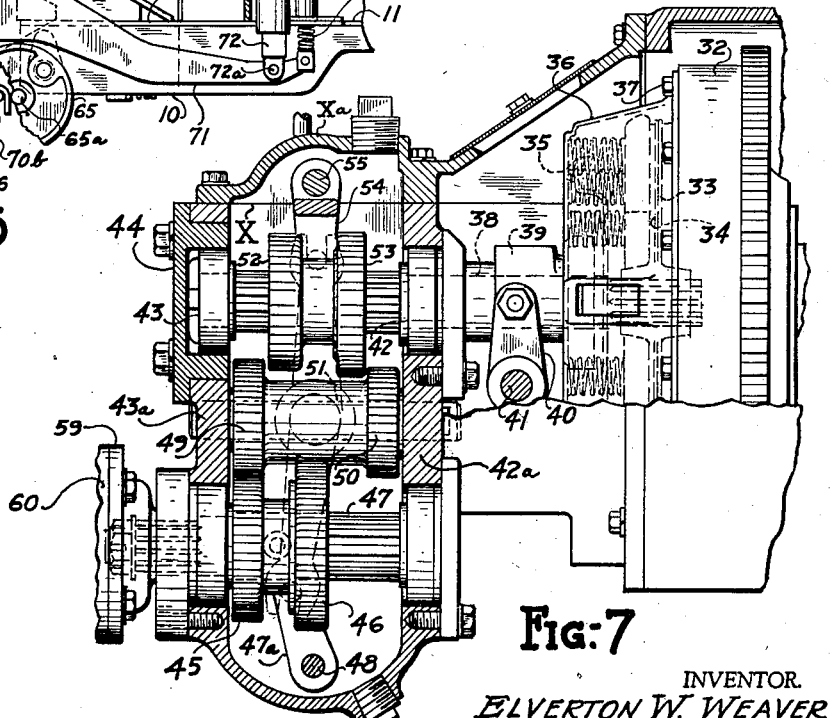
Fig. 7
INVENTOR.
ELVERTON W. WEAVER
BY
ATTORNEYS.

Oct. 20, 1942. E. W. WEAVER 2,299,445
INDUSTRIAL TRUCK
Filed Aug. 13, 1941 3 Sheets-Sheet 3

INVENTOR.
ELVERTON W. WEAVER
BY
ATTORNEYS.

Patented Oct. 20, 1942

2,299,445

UNITED STATES PATENT OFFICE 2,299,445

INDUSTRIAL TRUCK

Elverton W. Weaver, Cleveland Heights, Ohio, assignor to Towmotor Co., Cleveland, a co-partnership consisting of Lester M. Sears, Ruth P. Sears, and Mary Ann Sears, all of Shaker Heights, and Anna L. Sears, Cleveland, Ohio Application August 13, 1941, Serial No. 406,640

13 Claims. (Cl. 214—113)

This invention relates to industrial trucks, and has for its general object to provide a truck of this character wherein all of the operating parts will be so constructed and arranged as to enable an extremely simple and compact construction of truck to be realized.

Among the further and more limited objects of the invention are: to provide a truck of this character with a transmission mechanism and housing so arranged and located as to enable the input shaft and the clutch to be quickly and conveniently removed and replaced; also to provide a truck of this character with improved means for pivotally supporting and tilting the mast; also to provide a truck of this character with differential mechanism wherein the housing serves as a lateral brace between the opposite side members at the front of the truck; also to provide a truck of this character with a novel construction of double-reduction drive for the driving wheels. As will be pointed out, the construction and location of the parts referred to as constituting the more limited objects of the invention contribute to the main object, viz: the production of a truck which is compact and simple in construction.

Further objects of the invention will be set forth in the specification; and the various objects of the invention will be realized in and through the combinations of elements set forth in the claims appended hereto and illustrated in the drawings forming part hereof, wherein Fig. 1 represents a side elevation of a truck constructed in accordance with my invention; Fig. 2 a front elevation of the said truck; Fig. 3 a sectional plan view corresponding to the line 3—3 of Fig. 1; Fig. 4 a detail in sectional elevation of the front portion of the chassis of the truck, showing the differential housing, wheel carriers and the front wheel spindles; Fig. 5 a detail in sectional elevation of the front side portion of the truck shown in Fig. 1; Fig. 6 a sectional plan view of the rear portion of the said truck; Fig. 7 an enlarged detail in sectional elevation of the transmission; and Fig. 8 a sectional elevation of the differential mechanism including the housing and the double-reduction drive.

Describing the various parts by reference characters, 10 denotes the vertical flanges and 11 the horizontal flanges of the side rails or members of the truck frame. 12 denotes a cross member, preferably in the form of a wide and heavy plate, which connects the rear ends of the side members. 13 denotes skirt plates for the side rails or members which skirt plates are formed with the bottoms of the side body plates, to be described hereinafter, and which extend downwardly from the outer edges of the upper horizontal flanges of the said side rails or members and are coextensive in depth with the vertical flanges or webs of said members. These skirt plates extend forwardly from the side body plates and have their forward ends extending diagonally upwardly, as shown at 13ª, thereby to clear the front drive wheels. 14 denotes front vertical members of the side body plates and 14ª the rear vertical members of said plates, which are suitably secured to and supported by the side members of the frame, the rear ends of the members 14ª being bent inwardly, as shown at 14ª', to provide bumper plates, the inner opposed ends 14ᵇ of the bumper plates overhanging the radiator A of the engine B, the rear end of which is supported by the cross member 12. These plate members 14 and 14ª constitute vertical frame elements as well as part of the housing for the power plant.

15 denotes corner brace plates secured at their opposite ends respectively to the bodies of the plate members 14ª and to the bumper plate extensions 14ª' thereof and forming with the parts to which they are secured constructions approximating box girders in section, thereby to strengthen the rear corners of the truck and also to provide receptacles for material constituting a counterweight for the mast and the load carrier, and the loads which may be imposed upon the latter. 16 denotes a hood which is removably secured above and to the side body plate members 14. The plate members 14, hood 16, and the driver's seat (to be described) constitute a housing for the engine and part of the transmission housing.

17 denotes the rear steering axle which is supported at its central portion by the springs and at its ends by the rear steering wheels 18 which are pivotally supported by spindles 19 and are operated in the usual manner, by the tie rod arms 20, connected by a tie rod 21. 22 denotes the steering arm having its outer end connected with the drag link 23, which is operated in the usual manner by the steering wheel 24. The elements 17—24 are of standard construction, and, as thus far described, constitute in their details no part of my invention herein.

25 denotes the springs, the same having their rear ends pivotally supported from the cross member 12 by brackets 26 and being connected at their central portions to the axle 17 by means of flanges 17ª and standard U-bolts 27. The front ends of the springs are slidably mounted in spring guides 28 which are supported in turn by the transverse bar 29 carried by the side members 10. It will be noted that the springs converge from the rear ends thereof toward the front ends thereof, being in close proximity at their front ends. By this construction, ample space is provided for the maximum pivotal movements of the steering wheels 18 about their respective pivots.

The front of the housing 16 provides a back 16a for the rear cushion 30a of the driver's seat, the front cushion whereof is designated 30. The cushion 30 and its transverse supporting plate 31 form a removable cover extending the full width of the housing for the engine and by the removal of which convenient access may be had to the motor and to the portion of the transmission housing therebeneath. The front of the housing and the driver's seat are located near the longitudinal center of the truck.

Transmission and driving mechanism

This mechanism comprises the fly wheel 32, fixed clutch member 33, and movable clutch plate 34, adapted to be held in engagement with the member 33 by the springs 35, in the usual manner. 36 denotes the clutch cover plate secured to the fly wheel, as by means of bolts 37. This cover plate has a central opening for the passage therethrough of the clutch shaft 38, which also constitutes the input shaft for the transmission and on which is mounted the clutch collar 39, operated by the fork 40 and shaft 41 in the usual manner. The shaft 38 is mounted in bearings 42 and 43, the former bearing being located in one of the end walls 42a of the combined clutch and transmission housing proper, designated X and the latter bearing being located in a removable cap plate 44 provided in the other end wall 43a of the housing.

45 and 46 denote gears of different diameter slidably mounted on the output shaft 47 and adapted to be moved along said shaft by the fork 47a mounted on the shaft 48, operated by a gear shift lever in the usual manner. These gears are adapted to mesh with gears 49 and 50 of different diameters mounted on a counter shaft 51 located above the shaft 47. 52 and 53 denote gears which are slidably mounted upon the input shaft 38 above the countershaft 51 and which are adapted to be shifted by means of the fork 54 and the shaft 55. When the gear 52 is in mesh with the gear 49 and the latter is in mesh with the gear 45, the output shaft 47 will be driven ahead at a speed determined by the ratios between the gears 52, 49 and 45. When the gears 45 and 46 are shifted to the right, thereby bringing the gear 46 into mesh with the gear 50, the output shaft will be driven forward at a different rate of speed, determined by the ratios between the gears 52, 49 and 50 and 46. By shifting the gear 52 out of mesh with the gear 49, the gear 53 may be brought into mesh with a gear on a counter shaft (not shown) whereby the output shaft 54 may be driven in the reverse direction. As the construction of the reversing arrangement constitutes no part of the invention, it is believed that illustration of the same is unnecessary. Any customary construction and arrangement of countershaft and reversing gears may be provided and will be operated by one of the gear shift levers 57, 58 shown in Fig. 1, the change speed gears being operated by the other of said levers—the whole combination enabling two speeds forward and two speeds in reverse to be obtained, the forward and reverse gear ratios being preferably the same.

It will be noted that the output shaft 47 is located a considerable distance below the input shaft. This allows the engine to be supported in a convenient and efficient location and at the same time enables the output shaft to be situated in convenient operative relation to the shaft which drives the front driving wheels. Furthermore, the construction permits of convenient access to and removal of the clutch plate 34, for the purpose of repair or replacement, this result being accomplished by first removing the cap 44, which permits the clutch shaft to be withdrawn, after which the cover section Xa of the transmission housing may be removed, thus providing convenient access to the clutch cover plate 36, whereby it may be removed and access may then be had to the clutch plate 34.

The outer end of the ouput shaft 47 is splined to the companion flange 59 of the flexible coupling 60, the opposite companion flange 60a of which in turn is splined to the pinion shaft 60b which drives the differential mechanism. The pinion shaft 60b and pinion 60c are mounted within a housing 60d secured to the differential housing. The driven shaft sections 61 are mounted in the differential housing 62. Each shaft section is provided at its outer end with a pinion 63 meshing with an internal gear 64a in a front driving wheel 64, said wheels being mounted on spindles 65a secured to the central portions of the wheel carriers 65.

It will be noted that the ends of the differential housing are reduced, as shown at 62a, thereby to enable them to extend through openings provided therefor in the vertical flanges 10 of the side members. The reduced end portions of the housing extend beyond the side member flanges 10 and are welded to the wheel carriers 65, as indicated at 62b. The reduced ends 62a project from shoulders 62c which are adapted to engage the inner faces of the side-member flanges 10 surrounding the openings, thereby enabling the differential housing to serve as an efficient cross member for and brace between the front ends of the side members 10, 11, and also as a support for the wheel carriers.

Mast tilting mechanism 66 denotes a cylindrical cross bar, located in front of the ends of the side members 10, 11 and having its opposite ends connected to the wheel carriers. This bar serves not only as a rigid transverse brace between and for the wheel carriers, but also as a support for a hanger for the mast which comprises generally vertical side members 67, a load carrier comprising the carriage 68 and load supporting members 68a, and means including a hydraulic cylinder 69, cross head 69a and the usual chains (not shown) connected to the carriage and to the frame for raising and lowering the carriage along the mast. The lower end of the mast is supported by a hanger comprising a plate having a bottom flange 70 extending beneath and adapted to engage the bottoms of the members 67 of the mast, a vertical flange 70a adapted to engage the lower front surfaces of the said mast members, and a wide vertical plate 70b adapted to engage the lower rear surfaces of said mast members, the upper portion of the flange 70b being bent into an inverted U-shape, as shown at 70c, whereby the hanger comprising the parts 70—70c may be pivotally supported upon and by the cross bar 66 and may in turn support the mast by and upon said cross bar while imparting great lateral stability to the mast.

For the purpose of tilting the mast about the cross bar as a pivot, an arm 71 is secured to the outer side of each of the vertical mast members 67 and extends rearwardly outside the flanges 10 of the respective side members and beneath the flanges 11 thereof. 72 denotes the pistons of hydraulic jacks, the cylinder 73 of which are pivotally supported at their upper ends by lugs 73ª and pins 74 extending through said lugs and through opposite branches of U-shaped supports 75 which are secured respectively to the forward inwardly directed ends 14ᶜ of the body plates 14. The lower end of each of the pistons 72 is pivotally connected to the adjacent arm therebeneath, as indicated at 72ª.

It will be evident that, by supplying hydraulic fluid in a well known manner to the cylinders 73, the pistons 72 will be depressed, thereby to rock the upper portion of the mast rearwardly about the bar 66 as a pivot. For the purpose of returning the mast to its vertical position, the extreme rear end of each of the arms 71 is shown as connected to the lower end of a coil spring 76 extending through a horizontal flange 11 and having the portion thereabove conveniently located within the tube 77, which extends through the rear curved portion of the U-shaped support 75 and is secured thereto, as by welding, the lower end of the said tube being supported upon the horizontal flange 11 of the side member 10 by means of a flange base 77ª, whereby the tube serves as a brace between the rear end of the U-shaped support and the said flange 11. The upper end of the spring is secured to an adapter 78, conveniently supported upon the top of the said tube. In practice, these springs are each wound under a heavy initial tension which requires them to be stretched before they can be inserted into their respective tubes. Due to this manner of constructing the springs, I am able to obtain from springs of given dimensions maximum energy for enabling the said springs to return the mast to its vertical position.

The driver's seat, which extends the full width of the body comprising the housing side plate members, permits, by its removal, convenient access to the parts of the power plant thereneath and also to the tilt jacks which are located within the aforesaid portion of the body housing.

Due to the construction and arrangement of the parts shown and described herein and to the manner of assembling said parts, I am enabled to produce an industrial truck the length of which is materially less than that of trucks utilized heretofore for the same purposes as my truck, but without sacrificing any of the desirable qualities of such longer and larger trucks.

Having thus described my invention, what I claim is:

1. An industrial truck comprising, in combination, a frame having side members, driving wheels supported by and adjacent to the front ends of the said side members, a cross bar also supported from the front portions of the side members, a mast, a load supporting carriage movable along said mast, a hanger for said mast comprising a seat for the lower end of said mast and an inverted U-shaped hook carried by said seat and mounted upon the said cross bar, and means for tilting the said mast about the said cross bar as a pivot.

2. An industrial truck comprising, in combination, a frame having side members, driving wheels supported by and adjacent to the front ends of said side members, a cross bar also supported from the front portions of the side members and located in close proximity to and substantially coincidental with the axes of rotation of said wheels, a mast, a load supporting carriage movable along said mast, a hanger for said mast comprising a seat for the lower end of said mast and an inverted U-shaped hook carried by said seat and mounted upon the said cross bar, and means for tilting the said mast about the said cross bar as a pivot.

3. An industrial truck comprising, in combination, a frame having side members, a mast pivotally supported by and from the front portions of the side members, a tilting arm connected with each side of the mast and extending rearwardly therefrom, a tilt jack adjacent to each of the said side members and comprising each a hydraulic cylinder, means for pivotally supporting each cylinder, a piston within each cylinder having its lower end connected with the rear portion of the tilting arm adjacent thereto and a tension spring located rearwardly of each of said cylinders and each having its lower end connected to the portion of the tilting arm therebeneath, and a support for the upper end of each of said springs.

4. In the industrial truck recited in claim 3, each side member having a horizontal flange, a vertical housing extending upwardly from and supported by the side members, the means for pivotally supporting each cylinder comprising a rearwardly extending U-shaped supporting member secured to the front portion of the housing above the horizontal flange of each of the side members below said housing and to the upper end of each of which members a hydraulic cylinder is pivotally connected, and a brace having its lower end supported by the horizontal flange of each of said side members and secured at its upper end portion to the U-shaped support above such side member.

5. An industrial truck comprising, in ocmbination, a frame having side members, a power plant and transmission mechanism supported by said side members, a differential housing extending across and beyond the front portions of said side members, wheel carriers secured eccentrically thereof to the ends of the said differential housing, driving wheels on said carriers, driven shaft sections within the said differential housing, driving connections between the said driven shaft sections and the transmission mechanism and between the said shaft sections and the said wheels, a cross bar having its ends connected to said wheel carriers between the axes and the front peripheral portions thereof, a mast in front of the said cross bar, a load carrier movable along said mast, a hanger for said mast comprising a seat for the reception of the lower end of the mast and an inverted U-shaped flange extending from said seat and adapted to be rotatably supported on the said cross bar, and means for tilting the said mast about the said bar as a pivot, the ends of said bar being located in close proximity to the axes of rotation of said wheels.

6. An industrial truck comprising, in combination, a frame having side members, a differential housing extending across the front portions of the said side members and having reduced ends extending therethrough, with shoulders engaging the inner surfaces thereof, circular wheel carriers secured to the ends of the said differential housing, and a cross bar extending transversely of the front of the frame and having its ends rigidly secured to the said wheel carriers.

7. An industrial truck comprising, in combination, a frame having side members, a differential housing extending across the front portion of said side members and having reduced ends extending therethrough, with shoulders engaging the inner surfaces thereof, circular wheel carriers secured to the ends of the said differential housing, a cross bar extending transversely of the front of the frame and having its ends rigidly secured to the said wheel carriers, a mast comprising vertical side members and load raising and lowering mechanism mounted thereon, means pivotally supporting the mast on the said cross bar, and means for tilting the said mast about the said cross bar as a pivot.

8. An industrial truck comprising, in combination, a frame having side members, circular wheel carriers supported by the front portions of said side members, a cross bar extending transversely of the front of the frame and having its ends rigidly secured to the said wheel carriers, a mast comprising vertical side members and load raising and lowering mechanism mounted thereon, and means for pivotally supporting the said mast from the said cross bar, the said means comprising a plate extending transversely of the said mast and secured to the side members thereof and having an inverted U-shaped upper end adapted to be mounted upon the said cross bar, and means for tilting the said mast about the said cross bar as a pivot.

9. In the industrial truck recited in claim 8, the cross bar being located in close proximity to and substantially coincidental with the centers of the said wheel carriers.

10. An industrial truck comprising, in combination, a frame having side members, circular wheel carriers rigidly supported from the front portions of the side members, a cross bar extending across and supported from the front portions of the side members and having its ends rigidly secured to the wheel carriers in close proximity to the centers thereof, a mast, means pivotally supporting the mast from the cross bar, and means for tilting the mast about the cross bar as a pivot.

11. An industrial truck comprising, in combination, a frame having side members, driving wheels supported from and adjacent to the front ends of the said side members, a cross bar also supported from the front portions of the side members, a mast comprising vertical side members, a vertical plate extending transversely of the lower end of said mast and connected to the lower ends of the side members thereof, said plate being provided with means for pivotally mounting the same upon the said cross bar, and means for tilting the said mast about the cross bar as a pivot.

12. An industrial truck comprising, in combination, a frame having side members, a power plant supported from the rear portions of the side members, power operated mast tilting mechanism supported by said side members in front of the power plant, body members secured to and extending upwardly from the side members and including therebetween the power plant and the mast tilting mechanism, a hood secured to the upper ends of the rear portions of the said body members, and a seat extending across and removably supported on top of the upper ends of the side members in front of said hood, whereby the removal of the seat will permit access to the power plant, and to the power-operated mast-tilting mechanism.

13. An industrial truck comprising, in combination, a frame having side members, a power plant supported from the rear portions of the side members, clutch mechanism in front of said power plant, a clutch cover plate for said mechanism, power operated mast tilting mechanism supported by said side members in front of the power plant, body members secured to and extending upwardly from the side members and including therebetween the power plant, the clutch mechanism, the cover plate therefor, and the mast tilting mechanism, a hood secured to the upper ends of the rear portions of the said body members, and a seat extending across and removably supported on top of the upper ends of the side members in front of said hood, whereby the removal of the seat will permit access to the power plant, the clutch mechanism, the cover plate for the clutch mechanism, and the power-operated mast-tilting mechanism.

ELVERTON W. WEAVER.